United States Patent [19]

Bradshaw et al.

[11] 4,232,325
[45] Nov. 4, 1980

[54] THERMAL PRINTING DEVICE WITH SPRING SUPPORT TINES

[75] Inventors: Michael Bradshaw; Roger D. Edwards, both of Solihull, England

[73] Assignee: Leeds and Northrup Ltd., Birmingham, England

[21] Appl. No.: 77,965

[22] Filed: Sep. 24, 1979

[30] Foreign Application Priority Data

Nov. 8, 1978 [GB] United Kingdom ............... 43595/78

[51] Int. Cl.³ ..................... G01D 15/10; G01D 15/28
[52] U.S. Cl. .................................. 346/76 R; 346/136
[58] Field of Search ................. 346/76 R, 76 PH, 136

[56] References Cited

U.S. PATENT DOCUMENTS

| | | | |
|---|---|---|---|
| 3,389,401 | 6/1968 | Neff | 346/76 R |
| 3,512,174 | 5/1970 | Schwarzer | 346/76 R |

FOREIGN PATENT DOCUMENTS 1436036 5/1976 United Kingdom ............... 346/76 PH

*Primary Examiner*—George H. Miller, Jr.
*Attorney, Agent, or Firm*—William G. Miller, Jr.; Raymond F. MacKay

[57] ABSTRACT

An improved thermal printing device in which pressure is applied to hold the heat-sensitive paper 5 in contact with a print head 1 by a spring metal comb 8. The comb has a large number of tines (typically 2.5 per millimeter of the comb's width) and can be produced by an etching (or "chemical milling") process. The narrow width of the tines allows very good thermal contact with the print head to be achieved without resort being made to a rubber roller with a high contact pressure. This feature improves uniformity of print and reduces greatly the undesirable effect of the chart paper adhering to the print head through high contact pressure and local heating. The design of the path that the chart paper follows also reduces this undesirable adhering effect. The improved device is very suitable for chart recorders where the paper moves slowly.

3 Claims, 2 Drawing Figures

THERMAL PRINTING DEVICE WITH SPRING SUPPORT TINES

This invention relates to thermal printing devices. Printing devices comprising an array of resistors, known as print head, are used to print on a strip of heat-sensitive paper which is drawn over the print head. The array is commonly a linear array and the paper is moved in a direction perpendicular to the line of the resistors. The resistors are energized at appropriate instants to form dots on the paper. By advancing the paper at an appropriate rate, either stepwise or continuously and selecting the instants at which resistors are energized, the desired trace of symbol is produced on the paper. The periods of energization of the resistors are very short (of the order of milliseconds) and it is therefore necessary that very good thermal contact is provided between the print head and the paper. To this end it is customary to utilize a spring-loaded, ground rubber roller to hold the paper against the printhead. Owing to surface irregularities of both the roller and the print head or bowing of the substrate upon which the resistors are formed, it is necessary to use quite high spring pressures to produce the desired thermal contact between the paper and the print head. Otherwise variations in print density and even failure to print some dots can occur. Furthermore, since irregularities are compounded as length increases, it is only possible to obtain reasonable results (even with the application of high pressure) when the print head is fairly short.

The arrangement described above can work quite satisfactorily, with a print head restricted to not more than 50 mm in length, in applications where the paper is advanced stepwise with short stationary periods and when relatively few resistors are energized in one printing period. An example of such an application is a printer attached to an electronic calculator printing alphanumeric characters. However, when a printer is used in an application where the paper is advanced at relatively slow rate, e.g. by widely spaced step, such as in the case of a chart recorder in an industrial process, the problem of the paper adhering to the print head can arise. This is because of the far slower rate of movement of the paper, allowing the coating on the paper to stick to the resistors, and because sometimes it is necessary to energize all resistors simultaneously (or at least in very rapid succession) in order to create, for example, an ordinate line on a chart which is being produced by the printer.

According to the present invention there is provided thermal printing device comprising an array of selectively energizable resistors, paper-feed means for advancing heat-sensitive paper over the array of resistors, and a resilient comb having a plurality of tines each of which, in operation, presses the paper locally against a number of the resistors.

The invention thus enables the problem emphasized above to be overcome since it is now possible to apply pressure to small divisions of the width of the paper individually and thus avoid the necessity of using a high spring pressure to overcome the effect of surface irregularities in the print head and the roller.

In the preferred embodiment each tine spans two resistive elements. Even if the elements are not exactly coplanar, the tine can twist a little to ensure contact pressure over each element. In theory the tines can be even finer, say one per element, and satisfactory results can be anticipated when each tine spans more than two elements. The number of elements spanned by a tine does not have to be an integral number.

Conveniently the comb is formed by an etching (or "chemical milling") process and conveniently its tines are curved such that the tines are convex towards the resistors. The comb may be made from an alloy such as beryllium-copper or phosphor-bronze. Advantageously the comb is anchored by a bar with provision for adjustment along the length of the bar to allow the comb and print head to be made completely parallel. Advantageously the paper-feed means draw the paper away from the resisitors over the curved ends of the tines so as, in operation to provide a pull on the paper away from the resistors with a major component of the pull perpendicular to the plane of contact between the paper and resistors. Preferably then comb is protected by one or more shielding-plates to prevent its being accidentally damaged when, for example, the chart paper is being loaded into the printer.

An embodiment of the invention will now be described with reference to the drawings of a print head and pressure comb, in which.

Figure 1:
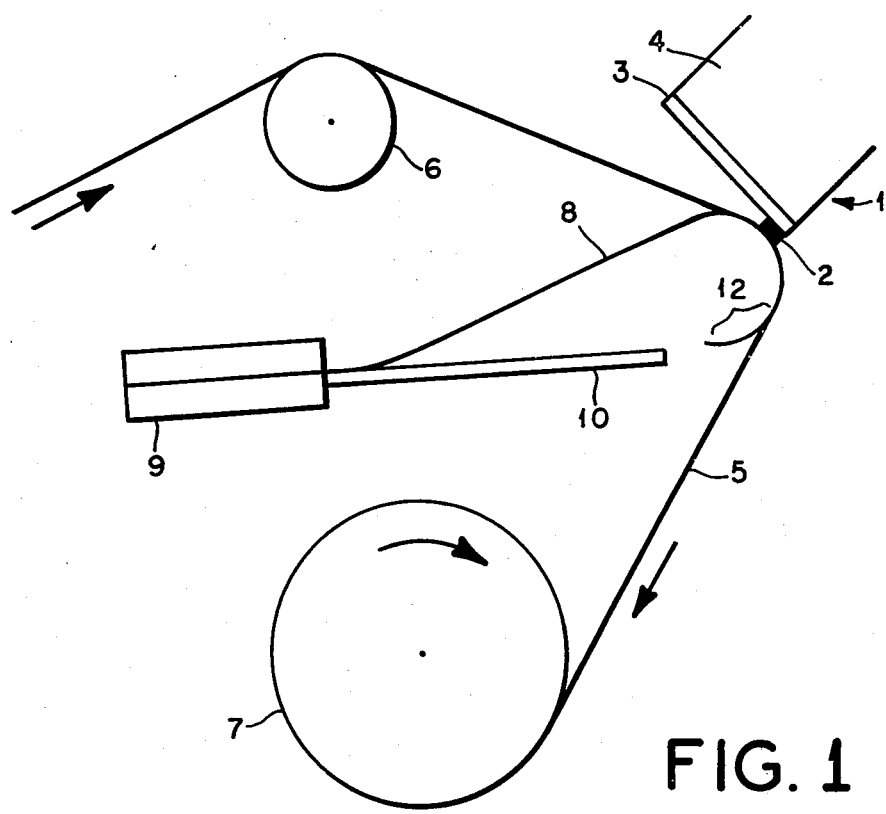
FIG. 1 is an end view of a print head and a pressure comb.

FIG. 1 shows a thermal print head 1 comprising a row of resistive elements 2, which produce a heating effect and are supported on a ceramic substrate 3 which is bonded to a heat sink 4. The resistive elements may be pitched as finely as 50 per centimeter and the substrate carried printed circuitry by way of which any selected resistive element may be energized. A strip of heat-sensitive paper 5 which is edge-perforated passes over a guide roller 6 and is wound onto a take-up roller 7 having sprocket pegs (not shown) around its ends. A pressure comb 8 shaped as shown in FIG. 1 is clamped in a clamping bar 9 which is adjustable to allow the comb to be made parallel to the print head 1. A shielding plate 10 is fixed in a position to protect the pressure comb 8 from accidental damage.

Figure 2:
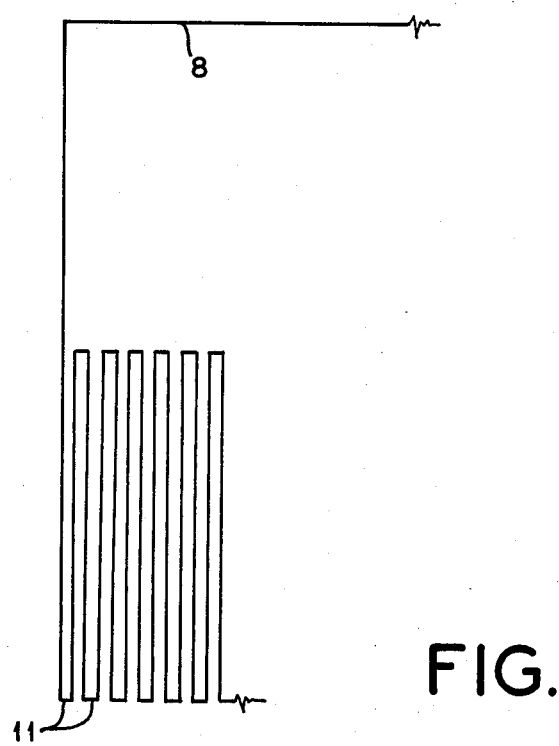
FIG. 2 is a plan view of the pressure comb featured in FIG. 1 (the width of the tines has been exaggerated).

FIG.2 is a fragmentary plan view of the pressure comb 8. The width of the comb is approximately 10 cm and there are approximately 256 tines 11, each being of width approximately 0.3 mm and having spaces therebetween of approximately 0.1 mm.

In operation, the paper is drawn onto the take-up roller 7 which is rotated in the direction shown by a driving mechanism, not shown. The tines of the pressure comb hold the paper in contact with the print head 1 which is formed into 512 resistive elements. This can be achieved by division of a resistive layer, laid-down by a thick film technique, by use of a laser beam. There is one tine per two resistive elements and so the paper is held in good thermal contact with the print head without resort being made to high pressure upon the paper. This is because the pressure comb can accommodate to irregularities in the surface of the print head. The tines are curved so as to be convex towards the resistive elements 2, thereby providing a surface over which the paper is smoothly guided. The paper is drawn away from the print head in a direction substantially perpendicular to the plane of contact between the paper and the resistive elements and this factor, combined with the use of the pressure comb, makes adherence of the paper to the print head very unlikely.

Although the tines are shown with free ends in FIG. 2, the ends may be joined to render the comb less liable to accidental damage. The joined ends must be sufficiently away from the elements 2 to allow the tines to flex individually at the elements 2. This will be the case if the joined ends extend only over say the region 12 in FIG. 1. The tines are formed by etching slots closed at both ends.

What is claimed is:

1. Thermal printing device comprising an array of selectively energizable resistors, paper-feed means for advancing heat-sensitive paper over the array of resistors, and a resilient comb having a plurality of tines each of which, in operation, presses the paper locally against a number of the resistors.

2. A device according to claim 1, wherein the end of each tine is curved so as to be convex towards the resistors.

3. A device according to claim 2, wherein the paper-feed means draw the paper away from the resistors over the curved ends of the tines so as, in operation to provide a pull on the paper away from the resistors with a major component of the pull perpendicular to the plane of contact between the paper and resistors.

* * * * *